US008781850B2

(12) United States Patent
Bazzani et al.

(10) Patent No.: US 8,781,850 B2
(45) Date of Patent: Jul. 15, 2014

(54) SYSTEM AND METHOD FOR ENHANCING AND AUTHENTICATING AN INSURANCE ELIGIBILITY TRANSACTION

(75) Inventors: Rod Bazzani, Naperville, IL (US); James Bohnsack, Chicago, IL (US); Martin Callahan, Lewis Center, OH (US); Milton Silva-Craig, Hinsdale, IL (US); Kathy Babcock, Naperville, IL (US); Michael Snitman, Great Falls, VA (US)

(73) Assignee: Trans Union LLC, Chicago, IL (US)

( * ) Notice: Subject to any disclaimer, the term of this patent is extended or adjusted under 35 U.S.C. 154(b) by 261 days.

(21) Appl. No.: 12/732,153

(22) Filed: Mar. 25, 2010

(65) Prior Publication Data

US 2011/0238451 A1   Sep. 29, 2011

(51) Int. Cl.
*G06Q 40/00* (2012.01)
*G06Q 40/08* (2012.01)
*G06Q 50/22* (2012.01)

(52) U.S. Cl.
CPC ............... *G06Q 40/00* (2013.01); *G06Q 40/08* (2013.01); *G06Q 50/22* (2013.01)
USPC ...................................... 705/2; 705/3; 705/4

(58) Field of Classification Search
CPC ........ G06Q 50/22; G06Q 40/08; G06Q 40/00
USPC ................................................... 705/2, 3, 4
See application file for complete search history.

(56) References Cited

U.S. PATENT DOCUMENTS

| | | | |
|---|---|---|---|
| 4,491,725 A | 1/1985 | Pritchard | |
| 4,916,611 A | 4/1990 | Doyle, Jr. et al. | |
| 5,070,452 A | 12/1991 | Doyle, Jr. et al. | |
| 5,359,509 A | 10/1994 | Little et al. | |
| 5,832,447 A | 11/1998 | Rieker et al. | |
| 5,930,759 A * | 7/1999 | Moore et al. | 705/2 |
| 7,356,460 B1 | 4/2008 | Kennedy et al. | |
| 7,720,700 B2 | 5/2010 | Balogh | |
| 7,739,132 B2 | 6/2010 | Denny, Jr. et al. | |

(Continued)

FOREIGN PATENT DOCUMENTS

| | | |
|---|---|---|
| KR | 10-2001-0078970 | 8/2001 |
| KR | 10-2003-0063537 | 7/2003 |
| WO | 2011120003 | 9/2011 |

OTHER PUBLICATIONS

International Search Report and Written Opinion for International Patent Application No. PCT/US2011/030072 dated Nov. 28, 2011.

*Primary Examiner* — Daniel Felten
(74) *Attorney, Agent, or Firm* — William J. Lenz; Neal, Gerber & Eisenberg LLP

(57) ABSTRACT

The disclosure presents a system, method, and computer readable medium for execution on a computer processor, for authenticating and enhancing an insurance eligibility transaction, such as a 270/271 healthcare system transaction. In a particular embodiment, an insurance eligibility transaction request, such as a 270 transaction, is received/intercepted by the system prior to being received by the payor and data from one or more sources, such as a credit bureau database containing credit file data, is used to enhance, verify and correct the accuracy of data fields particular to the insurance eligibility transaction. The payor's database(s) can also be enhanced accordingly. The system also has capability to, among other things, identify fraud-related issues, charity qualification, and patient payment estimation as part of the transaction.

30 Claims, 5 Drawing Sheets

(56) References Cited

U.S. PATENT DOCUMENTS

| | | |
|---|---|---|
| 7,778,850 B2 | 8/2010 | Wester |
| 7,797,165 B1 | 9/2010 | Beery et al. |
| 7,797,172 B2 | 9/2010 | Fitzgerald et al. |
| 7,805,322 B2 | 9/2010 | Flam et al. |
| 7,904,305 B2 | 3/2011 | Suringa |
| 2003/0069760 A1 | 4/2003 | Gelber |
| 2005/0288972 A1 | 12/2005 | Marvin et al. |
| 2006/0010016 A1 | 1/2006 | Kossol |
| 2006/0122870 A1 | 6/2006 | Austin et al. |
| 2006/0247947 A1 | 11/2006 | Suringa |
| 2008/0201176 A1* | 8/2008 | Keck et al. ............ 705/4 |
| 2009/0024416 A1 | 1/2009 | McLaughlin et al. |
| 2009/0055227 A1* | 2/2009 | Bakos ............ 705/4 |
| 2009/0094064 A1 | 4/2009 | Tyler et al. |
| 2009/0327363 A1 | 12/2009 | Cullen et al. |
| 2010/0063907 A1* | 3/2010 | Savani et al. ............ 705/30 |
| 2010/0070307 A1 | 3/2010 | Sinvhal-Sharma |
| 2010/0179838 A1 | 7/2010 | Basant et al. |
| 2011/0010189 A1 | 1/2011 | Dean et al. |
| 2011/0015949 A1 | 1/2011 | Ruszala et al. |
| 2011/0029321 A1 | 2/2011 | Rourke et al. |
| 2011/0099028 A1 | 4/2011 | van Der Veen et al. |

* cited by examiner

SYSTEM AND METHOD FOR ENHANCING AND AUTHENTICATING AN INSURANCE ELIGIBILITY TRANSACTION

TECHNICAL FIELD

The invention relates generally to a system and method for enhancing an insurance eligibility transaction, such as a healthcare insurance eligibility transaction. More particularly, the invention relates to a system and method for enhancing and authenticating insurance eligibility requests and responses, such as healthcare insurance eligibility requests and responses.

BACKGROUND OF THE INVENTION

When medical insurance eligibility claims are submitted, it is typically performed through computer based systems using electronic insurance eligibility transactions. Common industry terminology of one form of these transactions is a 270/271 transaction. Electronic insurance eligibility transactions, such as the 270 insurance eligibility transaction requests and the 271 insurance eligibility transaction responses, typically take place between a hospital/physician (healthcare provider) and a payor (insurance provider) to determine whether a patient has healthcare insurance coverage and benefits, such as co-pay, co-insurance, and/or deductibles. Quite often, insurance eligibility transaction responses return "member not found" (no information found for the person for which the insurance eligibility transaction request was made), or inaccurate data likely due to the wrong patient being identified for insurance coverage.

Despite the advances in the field, the industry is in need of more efficient systems and methods for enhancing and authenticating insurance eligibility transactions.

SUMMARY OF THE INVENTION

The invention is directed to a system, method, and computer readable medium for execution on a computer processor, for authenticating and enhancing an insurance eligibility transaction. The system includes an authentication/enhancement computer having a processor and an associated memory. The memory includes authentication/enhancement program code. The program code is configured to receive an insurance eligibility transaction request, such as a 270 healthcare system transaction, having target personal information for a person, such as a policy holder insured and/or a patient, associated with the insurance eligibility transaction request. The insurance eligibility transaction request can be received from a healthcare provider. The target personal information can include a target name, a target address, a target social security number, a target insurance member identification code, a target insurance group code, a target insurance card issue date, a target date of birth, and/or other information.

The system also includes a demographic database within a personal identity database, such as a personal credit reporting database or subset thereof. The program code is further configured to query the demographic data, and to determine whether the target personal information matches the demographic data within the personal identity database. The program code is further configured to transmit the insurance eligibility transaction request having the verified personal information therein to a payor for determining whether the insurance eligibility request should be granted and for determining eligibility terms under which the insurance eligibility request should be granted. The program code can be further configured to append or correct associated demographic information from within the personal identity database to the target personal information within the insurance eligibility transaction request. The associated demographic information can include demographic information that was not previously comprised within insurance eligibility transaction request. The associated demographic information can include a name, an address, a social security number, an insurance member identification code, an insurance group code, an insurance card issue date, a date of birth, a credit score, alert information, such as an indication that a fraud has occurred or may be occurring, as well as other information. The program code can be also be configured to designate the target personal information as verified personal information, if there is a match between the target personal information and the demographic data. The insurance eligibility transaction request can include the verified personal information.

In another embodiment, the system can include an authentication/enhancement computer having a processor and an associated memory. The memory includes an authentication/enhancement program code, with the program code being configured to receive an insurance eligibility transaction response, such as a 271 healthcare system transaction, having a coverage determination of whether the insurance eligibility request should be granted for the person. The insurance eligibility transaction response can also include eligibility terms for the person if a positive coverage determination is provided by the insurance provider. The eligibility terms can include at least benefit levels such as co-pay information and/or deductible information. The system can also include a demographic database within a personal identity database, with the program code being further configured to query the demographic data, and to append additional associated demographic information from within the personal identity database to the insurance eligibility transaction response.

The system can include an ancillary data database with the program code being configured to query ancillary data within an ancillary data database, including potential fraud indicator information, and to determine whether the demographic data and/or the target personal information may have been used in a fraudulent manner. The program code can also be configured to determine whether the person qualifies for third party subsidy payments, assuming they do not have insurance coverage, if the coverage determination is less than a maximum threshold level, and append third party subsidy payment information to the insurance eligibility transaction response if the person qualifies for third party subsidy payments and/or does not have insurance coverage. The program code can further be configured to estimate an amount of insurance coverage based on the coverage determination information provided within the insurance eligibility transaction response from the insurance provider, and append the coverage estimation to the insurance eligibility transaction response.

Other systems, methods, features, and advantages of the invention will be, or will become, apparent to one having ordinary skill in the art upon examination of the following drawings and detailed description. It is intended that all such additional systems, methods, features, and advantages included within this description, be within the scope of the invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
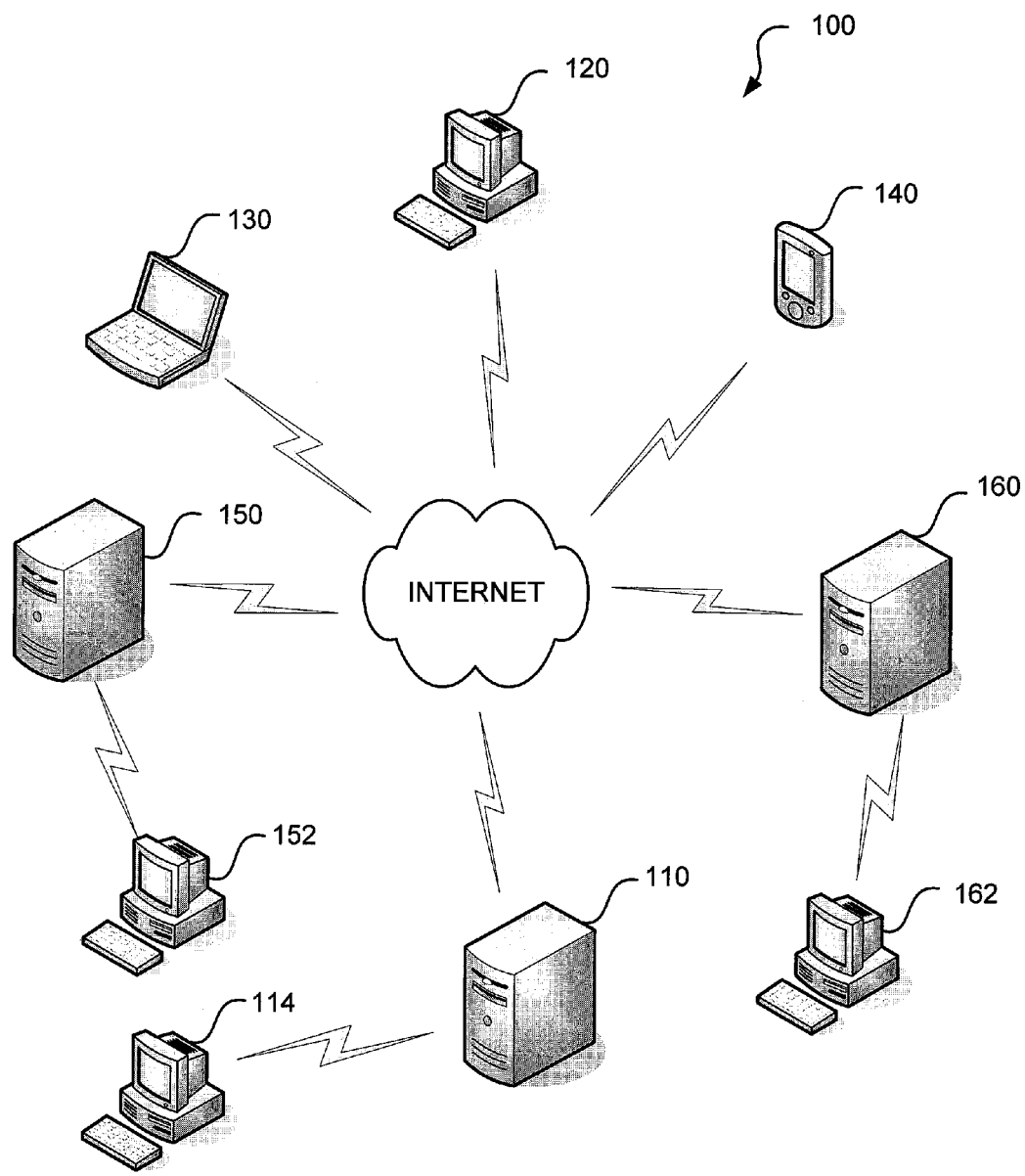
FIG. 1 is a graphical representation of an exemplary embodiment of a computer based insurance eligibility transaction enhancement and authentication system.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

As provided above, when medical insurance eligibility claims are submitted, it is typically performed through computer based systems using electronic insurance eligibility transactions. Common industry terminology of one form of these transactions is a 270/271 transaction. Electronic insurance eligibility transactions, such as the 270 insurance eligibility transaction requests and the 271 insurance eligibility transaction responses typically take place between a hospital/physician (healthcare provider) and a payor (insurance provider) to determine whether a patient has healthcare insurance coverage and benefit determination, such as co-pay, co-insurance, and/or deductible information. Quite often, insurance eligibility transaction responses return "member not found" (no information found for the person for which the insurance eligibility transaction request was made), or inaccurate data likely due to the wrong patient being identified for insurance coverage. The present invention authenticates and/or enhances insurance eligibility transactions to reduce or minimize returned "member not found" and/or inaccurate data.

FIG. 1 is a graphical representation of an exemplary embodiment of a computer based insurance eligibility transaction enhancement and authentication system 100. The system includes a plurality of healthcare provider computers 120, 130, 140, such as client computers, which are in communication with a network, such as the Internet, a manner which is known in the art and which will be better understood from the below description. These remote computers 120, 130, 140 each can run a healthcare provider/insurance eligibility claim program, as well as an interface program such as an Internet browser application, for connecting to the network, such as the Internet, capable of communicating with a centralized insurance eligibility transaction enhancement and authentication facilitator application or system, which can be server-based and running in an application service provider arrangement. Specifically, for communicating with the healthcare provider computers 120, 130, 140, a central insurance eligibility transaction enhancement and authentication facilitation computer 110 is connected to and in communication with a network, such as the Internet, in a manner which is known in the art. Firewall and other security systems, applications, and protocols (not shown) may be used to prevent and deter unauthorized access to the insurance eligibility transaction enhancement and authentication facilitation computer 110 and data associated therewith, as is known in the computer networking art.

The system also includes a plurality of insurance provider (payor) computers 150, 160, which are connected to and in communication with a network, such as the Internet, a manner which is known in the art and which will be better understood from the below description. These computers 150, 160 each can run an insurance provider/insurance eligibility claims processing program, as well as an interface program, such as an Internet browser application, for connecting to the Internet, capable of communicating with a centralized insurance eligibility transaction enhancement and authentication facilitator application or system, which can be server-based and running in an application service provider arrangement. Specifically, for communicating with the insurance provider computers 150, 160, a central insurance eligibility transaction enhancement and authentication facilitation computer 110 is in communication with a network, such as the Internet, in a manner which is known in the art. Firewall and other security systems and applications (not shown) may be used to prevent and deter unauthorized access to the insurance eligibility transaction enhancement and authentication facilitation computer 110, as is known in the computer networking art.

For the central insurance eligibility transaction enhancement and authentication facilitation computer 110 and the insurance eligibility transaction enhancement and authentication facilitator application or system therein, as will be described in more detail below, an insurance eligibility transaction enhancement and authentication administration client computer 114 may be connected to and may be placed in communication with the insurance eligibility transaction enhancement and authentication facilitation computer 110 for interfacing with the insurance eligibility transaction enhancement and authentication facilitation computer 110 to provide installation, set-up, and/or ongoing maintenance interface functions.

For the insurance provider computers 150, 160 and the insurance provider application or program therein, respective insurance provider administration client computers 152, 162 may be connected to and may be placed in communication with the insurance provider computers 150, 160 for interfacing with the insurance provider computers 150, 160 to provide installation, set-up, ongoing maintenance, and other standard interface functions.

The insurance eligibility transaction enhancement and authentication facilitation computer 110 may also be connected to and be in communication with one or more third party computers or servers (not shown). One example of a third party computer is a credit card company computer which can provide various real time banking or credit card information about individuals, such as patients. Another example of a third party computer is a credit bureau computer which can provide credit file information about patients. Yet another example of a third party computer is a healthcare institution computer which can provide various real time patient information about one or more of the patients for verifying previous medical treatment or insurance information.

Figure 2:
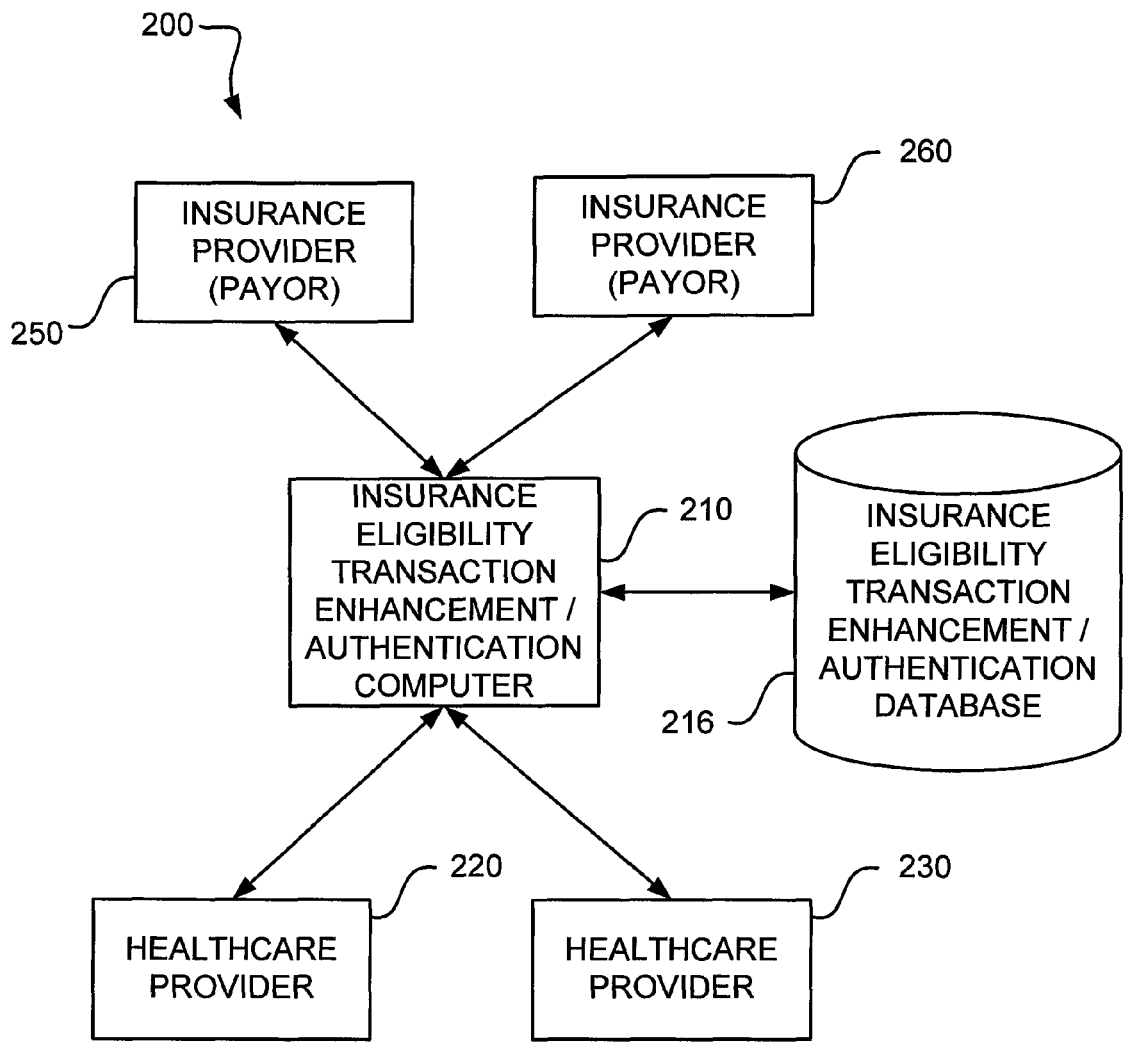
FIG. 2 is a block diagram of a particular form of the insurance eligibility transaction enhancement and authentication system of FIG. 1.

FIG. 2 is a block diagram of the computer based insurance eligibility transaction enhancement and authentication system 200 of FIG. 1. Specifically, each of the computers 120, 130, 140 of FIG. 1 can perform and function a healthcare provider computer 220, 230. The healthcare provider computer 220, 230 blocks of FIG. 2 may also represent a set of interface screens and functionality for performing all of the healthcare provider functions, which are connected to and in communication with the insurance eligibility transaction enhancement and authentication computer 210. Likewise, each of the computers 150, 160 of FIG. 1 can perform and function as a insurance provider computer 250, 260. The insurance provider computer 250, 260 blocks of FIG. 2 may also represent a set of interface screens and functionality for performing all of the insurance provider functions, which are in communication with the insurance eligibility transaction enhancement and authentication computer 210. Further, the insurance eligibility transaction enhancement and authentication facilitation computer 210 block of FIG. 2 can also represent various sets of interface screens and functionality for performing all of the functions provided by the insurance eligibility transaction enhancement and authentication facilitation computer 210, which is in communication with a demographic database, personal identity database, and/or ancillary information database 216 residing within a memory.

Figure 3:
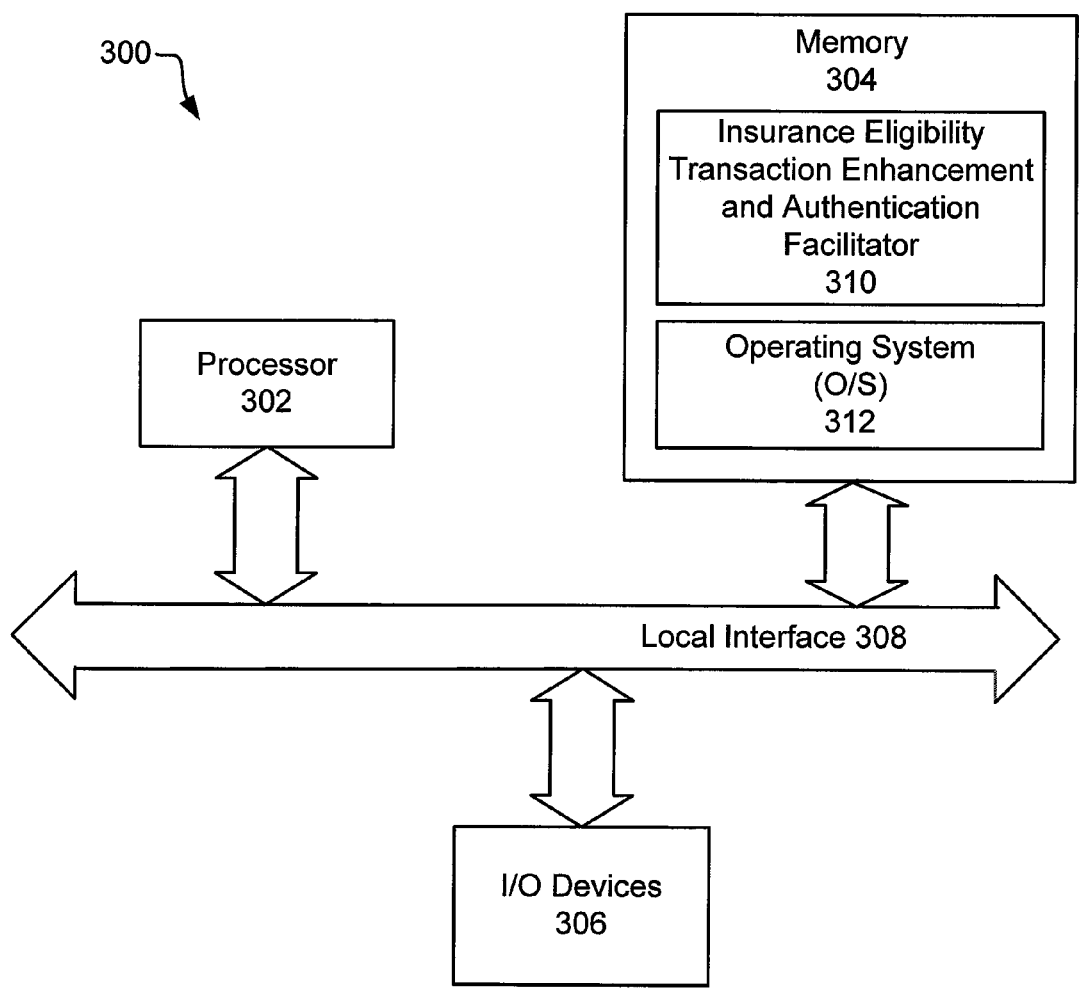
FIG. 3 is a block diagram of a particular form of a computer or server of FIG. 1 and/or FIG. 2, having a memory element with a computer readable medium for implementing the insurance eligibility transaction enhancement and authentication system.

FIG. 3 is a block diagram of a computer 300. The computer 300 may be the insurance eligibility transaction enhancement and authentication facilitation computer 110 of FIG. 1 and/or the insurance eligibility transaction enhancement and authentication facilitation computer 210 of FIG. 2. The computer 300 may include a memory element 304. The memory element 304 may include a computer readable medium for implementing the system and method for authenticating and enhancing an insurance eligibility transaction.

The insurance eligibility transaction enhancement and authentication facilitator system 310 may be implemented in software, firmware, hardware, or any combination thereof. For example, in one mode, the insurance eligibility transaction enhancement and authentication facilitator system 310 is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. Therefore, computer 300 may be representative of any computer in which the insurance eligibility transaction enhancement and authentication facilitator system 310 resides or partially resides.

Generally, in terms of hardware architecture, as shown in FIG. 3, the computer 300 includes a processor 302, memory 304, and one or more input and/or output (I/O) devices 306 (or peripherals) that are communicatively coupled via a local interface 308. The local interface 308 may be, for example, but is not limited to, one or more buses or other wired or wireless connections, as is known in the art. The local interface 308 may have additional elements, which are omitted for simplicity, such as controllers, buffers (caches), drivers, repeaters, and receivers, to enable communications. Further, the local interface may include address, control, and/or data connections to enable appropriate communications among the other computer components.

Processor 302 is a hardware device for executing software, particularly software stored in memory 304. Processor 302 can be any custom made or commercially available processor, a central processing unit (CPU), an auxiliary processor among several processors associated with the computer 300, a semiconductor based microprocessor (in the form of a microchip or chip set), another type of microprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., or a 68xxx series microprocessor from Motorola Corporation. Processor 302 may also represent a distributed processing architecture such as, but not limited to, SQL, Smalltalk, APL, KLisp, Snobol, Developer 200, MUMPS/Magic.

Memory 304 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 304 may incorporate electronic, magnetic, optical, and/or other types of storage media. Memory 304 can have a distributed architecture where various components are situated remote from one another, but are still accessed by processor 302.

The software in memory 304 may include one or more separate programs. The separate programs comprise ordered listings of executable instructions for implementing logical functions. In the example of FIG. 3, the software in memory 304 includes the insurance eligibility transaction enhancement and authentication facilitator system 310 in accordance with the present invention, a suitable operating system (O/S) 312. A non-exhaustive list of examples of suitable commercially available operating systems 312 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). Operating system 312 essentially controls the execution of other computer programs, such as the insurance eligibility transaction enhancement and authentication facilitator system 310, and provides scheduling, input-output control, file and data management, memory management, and communication control and related services.

The insurance eligibility transaction enhancement and authentication facilitator system 310 may be a source program, executable program (object code), script, or any other entity comprising a set of instructions to be performed. When a "source" program, the program needs to be translated via a compiler, assembler, interpreter, or the like, which may or may not be included within the memory 304, so as to operate properly in connection with the O/S 312. Furthermore, the insurance eligibility transaction enhancement and authentication facilitator system 310 can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, .Net, HTML, and Ada. In one embodiment, the insurance eligibility transaction enhancement and authentication facilitator system 310 is written in Java and .Net.

The I/O devices 306 may include input devices, for example but not limited to, input modules for PLCs, a keyboard, mouse, scanner, microphone, touch screens, interfaces for various medical devices, bar code readers, stylus, laser readers, radio-frequency device readers, etc. Furthermore, the I/O devices 306 may also include output devices, for example but not limited to, output modules for PLCs, a printer, bar code printers, displays; etc. Finally, the I/O devices 306 may further comprise devices that communicate with both inputs and outputs, including, but not limited to, a modulator/demodulator (modem; for accessing another device, system, or network), a radio frequency (RF) or other transceiver, a telephonic interface, a bridge, and a router.

If the computer 300 is a PC, workstation, PDA, or the like, the software in the memory 304 may further include a basic input output system (BIOS) (not shown in FIG. 3). The BIOS is a set of essential software routines that initialize and test hardware at startup, start the O/S 312, and support the transfer of data among the hardware devices. The BIOS is stored in ROM so that the BIOS can be executed when computer 300 is activated.

When computer 300 is in operation, processor 302 is configured to execute software stored within memory 304, to communicate data to and from memory 304, and to generally control operations of computer 300 pursuant to the software. The insurance eligibility transaction enhancement and authentication facilitator system 310, and the O/S 312, in whole or in part, but typically the latter, may be read by processor 302, buffered within the processor 302, and then executed.

When the insurance eligibility transaction enhancement and authentication facilitator system 310 is implemented in software, as is shown in FIG. 3, it should be noted that the insurance eligibility transaction enhancement and authentication facilitator system 310 can be stored on any computer readable medium for use by or in connection with any computer related system or method, although in one embodiment, the insurance eligibility transaction enhancement and authentication facilitator system 310 is implemented in a centralized application service provider arrangement. The insurance eligibility transaction enhancement and authentication facilitator system 310 can be embodied in any type of computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" may be any means that can store, communicate, propagate, or transport the program for use by or in connection with the instruction execution system, apparatus, or device. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

In another embodiment, where the insurance eligibility transaction enhancement and authentication facilitator system 310 is implemented in hardware, the insurance eligibility transaction enhancement and authentication facilitator system 310 may also be implemented with any of the following technologies, or a combination thereof, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Likewise, the healthcare provider computers 120, 130, 140, and the healthcare provider programs/applications 220, 230 therein, the insurance provider computers 150, 160, and the insurance provider programs/applications 250, 260 therein, as well as standard insurance eligibility transaction requests and responses, such as industry standard "270" requests and "271" responses, can be implemented in any number of the ways, such as any of the ways in which the insurance eligibility transaction enhancement and authentication facilitator system 310 is described above as being implemented, and as one of ordinary skill in the art would understand.

Figure 4:
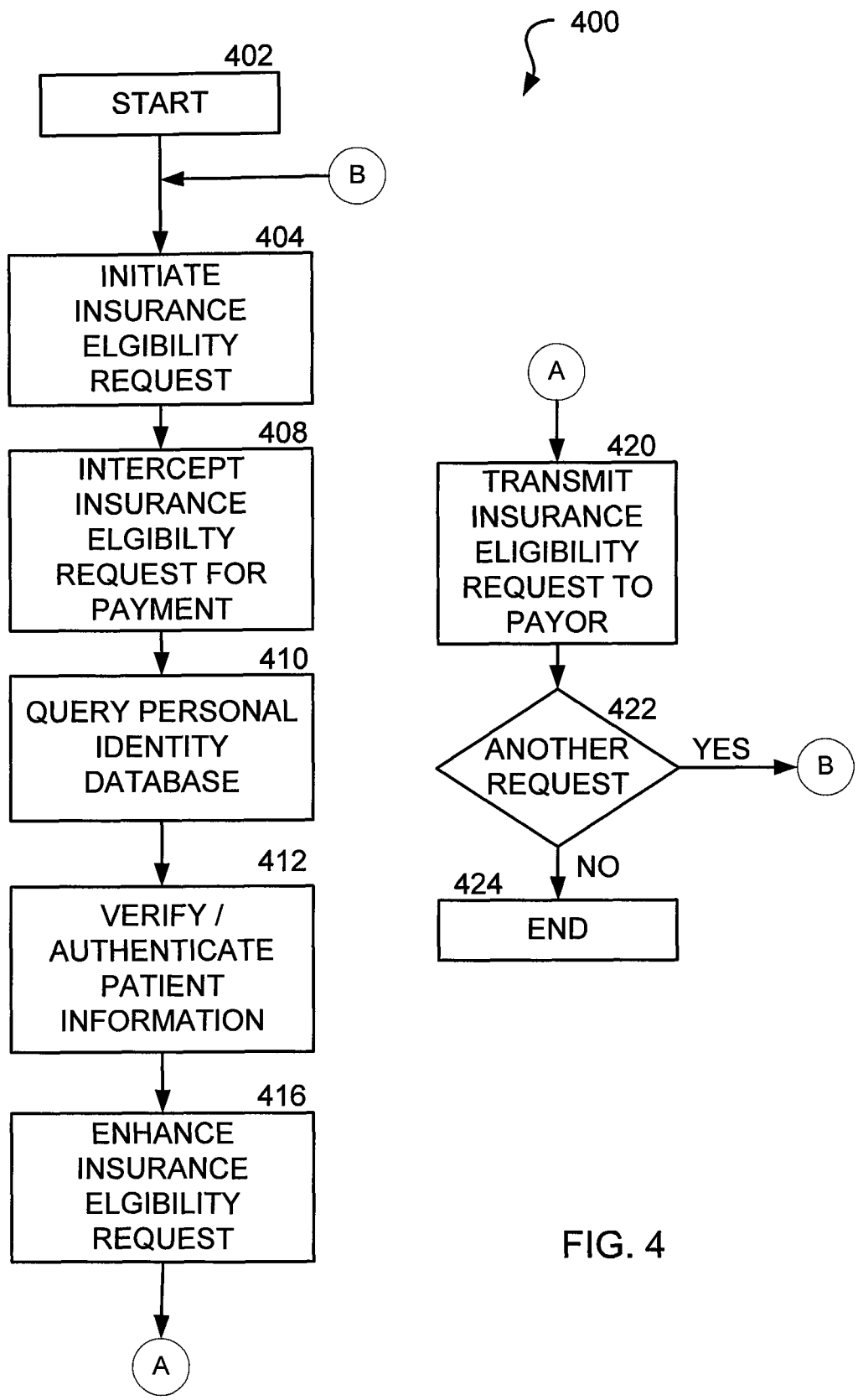
FIG. 4 is a flowchart showing an exemplary embodiment of the insurance eligibility transaction enhancement and authentication facilitator of FIG. 3.
Figure 5:
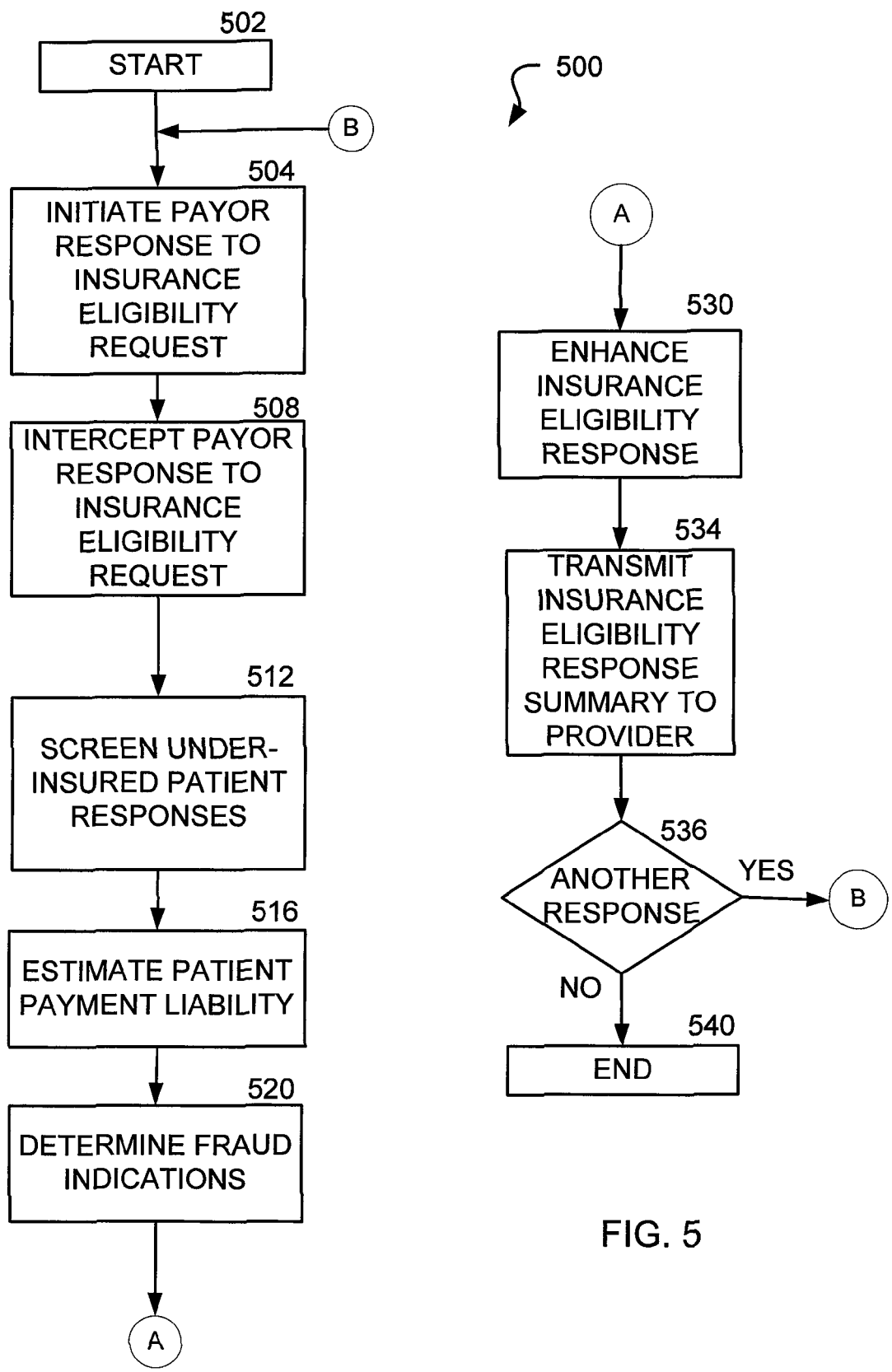
FIG. 5 is a flowchart showing another exemplary embodiment of the insurance eligibility transaction enhancement and authentication facilitator of FIG. 3.

FIGS. 4 and 5 are flowcharts showing first and second exemplary embodiments of the insurance eligibility transaction enhancement and authentication facilitator 310 of FIG. 3, shown as blocks within FIGS. 4 and 5, which can be considered facilitator system 400 as well or in the alternative. In block 402, one of the processors calls or triggers the facilitator system 210, 310, 400 or healthcare provider program/application 220, 230. After block 402, the facilitator system 210, 310, 400 moves to block 404. In block 404, healthcare provider program/application 220, 230 initiates sending or communicating an insurance eligibility request to the facilitator system 210, 310, 400. Prior to this process occurring, basic information about the patient and the insured person will have been entered within interface screens and various prompts therein, through and within the healthcare provider program/application 220, 230. Thus, in one example, patient/insured information prompts are communicated to and/or through the healthcare provider computers 120, 130, 140, to a care giver for allowing the caregiver to enter patient/insured information, such as patient/insured's name, address, date of birth, full or partial social security number, insurance policy name, insurance group code, insurance card issue date, and/or other information. The healthcare provider computers 120, 130, 140 and healthcare application/program therein can then utilize this information along with treatment codes to transmit/submit an electronic insurance eligibility request, such as a 270 request, as one of ordinary skill in the art would understand, over a computer network, such as the Internet, to an insurance provider (payor). An insurance eligibility request typically will include target personal information for the insured and/or for the patient, including one or more of the following target personal information: a target name, a target address, a target social security number, a target insurance member identification code, a target insurance group code, a target insurance card issue date, a target date of birth, and/or other target information.

After block 404, the facilitator system 210, 310, 400 moves to block 408. At block 408, the system 210, 310, 400 has logic for intercepting and receiving the insurance eligibility transaction request having the target personal information for the insured and/or patient associated with the insurance eligibility transaction request. The facilitator system 210, 310, 400 intercepts the insurance eligibility transaction request prior to the insurance eligibility transaction request reaching the insurance provider. After block 408, the facilitator system 210, 310, 400 moves to block 410. At block 410, the system 210, 310, 400 has logic for determining whether target personal information within the insurance eligibility request matches demographic data within a personal identity database, as will be explained herein. Specifically, in one embodiment, the facilitator system 210, 310, 400 parses out each of the pieces of target personal information, and one by one queries an insurance eligibility transaction enhancement/authentication database 216 to determine if each piece of target personal information exists within the insurance eligibility transaction enhancement/authentication database 216. The insurance eligibility transaction enhancement/authentication database 216 is a database which is likely more accurate and includes more information for each insured and/or patient than the insurance providers' databases used to determine insurance eligibility transaction requests, leading to abovementioned insurance eligibility transaction responses returning "member not found" or inaccurate data, without utilization of the facilitator system 210, 310, 400. One example of an insurance eligibility transaction enhancement/authentication database 216 can be a credit bureau database, such as one or more credit reporting databases provided by TransUnion LLC. This database can be enhanced to include insurance provider and associated information, such as insurance member identification code, an insurance group code, and/or insurance card issue date, for each person within the database, prior to implementation. Alternatively, insurance provider information and associated information can be added and stored to the insurance eligibility transaction enhancement/ authentication database 216 as each insurance eligibility transaction request is received by the facilitator system 210, 310, 400, assuming such information is included within each insurance eligibility transaction request. The insurance eligibility transaction enhancement/authentication database 216 or personal identity database can include "demographic data" for the individuals for which information exists within the insurance eligibility transaction enhancement/authentication database 216. The "demographic data" can include a name, an address, a social security number, an insurance member identification code, an insurance group code, an insurance card issue date, a date of birth, a credit score, and/or other demographic information.

After block 410, the facilitator system 210, 310, 400 moves to block 412. At block 412, the system 210, 310, 400 has logic for verifying or authenticating the target personal information. Specifically, in one embodiment, if the facilitator system 210, 310, 400 determines that there are one or more matches between the target personal information and the demographic data, then the facilitator system 210, 310, 400 will make an initial determination of whether the matching information is sufficient to conclude that the target person within the insurance eligibility transaction request is the same as the person listed within the insurance eligibility transaction enhancement/authentication database 216. If the determination is positive, then the facilitator system 210, 310, 400 will also then verify whether all of the pieces of target personal information are the same as the demographic data stored within the insurance eligibility transaction enhancement/authentication database 216 for the person. If any of the information within target personal information is not the same as the demographic data for the person, the facilitator system 210, 310, 400 can be configured to replace one or more pieces of the target personal information with the demographic data, in order to verify that the target personal information is authentic. The facilitator system 210, 310, 400 can also be configured to add verification information to the insurance eligibility request, designating the one or more of the pieces of target personal information as verified personal information, if there is a match between the target personal information and the demographic data. At this stage, the facilitator system 210, 310, 400 can be configured to transmit the insurance eligibility transaction request having the verified personal information therein to an insurance provider for determining whether the insurance eligibility request should be granted and for determining eligibility terms under which the insurance eligibility request should be granted.

Alternatively or additionally, after block 412, the facilitator system 210, 310, 400 moves to block 416. At block 416, the system 210, 310, 400 has logic for appending demographic information from within the insurance eligibility transaction enhancement/authentication database 216 to the target personal information within the insurance eligibility transaction request. The demographic information that is appended or added to the request can be demographic data that was not previously a part of the insurance eligibility transaction request. This demographic data can include a name, an address, a social security number, an insurance member identification code, an insurance group code, an insurance card issue date, a date of birth, a credit score, and/or other demographic information. The verified/authenticated and/or appended data or information can be used by the insurance provider in making sure that a proper identification of the insured and/or patient takes place. In addition, this verified/authenticated data or information can be also used to correct and/or enhance the insurance provider's database and the information that the insurance provider has within such database for the insured and/or patient. Thus, for any verified/authenticated personal information for the insured and/or patient within the insurance eligibility request that is different than the information within the insurance provider's database, such verified/authenticated personal information is used to replace the information within the insurance provider's database for that insured and/or patient. Likewise, for any appended personal information for the insured and/or patient within the insurance eligibility request that is different than or additional to the information within the insurance provider's database, such appended personal information is used to replace or add to the information within the insurance provider's database for that insured and/or patient.

The demographic information can also include alert information, such as information or an indication that the insured, patient, and/or healthcare provider has committed fraud in the past and/or may be attempting to commit fraud with the submission of the insurance eligibility transaction request. This information can then be used by the insurance provider within their determination of whether to pay on the insurance eligibility transaction request.

After block 416, the facilitator system 210, 310, 400 moves to block 420. At block 420, the system 210, 310, 400 has logic for transmitting the authenticated and/or enhanced insurance eligibility transaction request to one or more insurance provider computers 150, 160, and the insurance provider programs/applications 250, 260 therein (to the insurance provider (payor)), for determining whether the insurance eligibility transaction request should be granted for the person, and for other determinations. Specifically, as one of ordinary skill in the art would understand, the insurance provider computers 150, 160, and the insurance provider programs/applications 250, 260 therein, receive the insurance eligibility transaction request and perform one or more matching steps on the request to attempt to match the verified/enhanced personal information about the insured/patient from within the request with information that may be within the insurance provider's database of insured persons for that insurance provider. The insurance provider database of insured persons is stored within an insurance provider computer memory associated with and in communication with the insurance provider computers 150, 160, and the insurance provider programs/applications 250, 260 therein. If there is match between one or more of the verified/enhanced personal information within the request and information associated with the insured persons (insured or patient) within the insurance provider database, then the insurance provider programs/applications 250, 260 can be configured to parse out each piece of information within the request for the insured/patient and determine whether each piece of information about the insured/patient within the request is the same as and/or exists within the insurance provider database for the insured/patient. After the insurance provider computers 150, 160, and the insurance provider programs/applications 250, 260 therein determine that the person within the request is the same as a person within the insurance provider database, then the verified and/or enhanced pieces of information about the insured/patient within the request, which are incorrect and/or are missing within the insurance provider database, are used by the insurance provider computers 150, 160, and the insurance provider programs/applications 250, 260 therein to replace the incorrect and/or missing information within the insurance provider database, in order to enhance the data about each person within the insurance provider database.

Relative to the insurance eligibility transaction request portion of the insurance eligibility transaction enhancement and authentication facilitator system 210, 310, 400, after block 420, the facilitator system 210, 310, 400 moves to decision block 422. At decision block 422, the facilitator system 210, 310, 400 has logic for determining whether there are any additional insurance eligibility transaction requests to process. If there are no additional requests to process, then the facilitator system 210, 310, 400 moves to decision block 424, and the process ends until a further request is received by the facilitator system 210, 310, 400. If there is one of more additional insurance eligibility transaction requests to process, then the facilitator system 210, 310, 400 moves back to decision block 404, and the process begins again.

The insurance provider computers 150, 160, and the insurance provider programs/applications 250, 260 therein, also perform various standard determinations relative to insurance eligibility requests that have been received from the insurance eligibility transaction enhancement and authentication facilitator system 210, 310, 400. Specifically, in addition to the insurance provider computers 150, 160, and the insurance provider programs/applications 250, 260 therein, determining whether an insured/patient exists within the insurance provider database, if such a match exists within the database relative to the information provided within the request, the insurance provider programs/applications 250, 260 also at least determine: 1) whether the insured/patient is presently covered by an insurance policy; 2) the benefit level for such insured/patient and for the type of medical treatment provided to the patient, including co-pay requirements and/or the existence of co-insurance and such co-insurance requirements, for such insured/patient; 3) credits or payments made toward the deductable as of the date of the request; and, any other state of the art determinations that are made by the insurance providers. As a result of these determinations, the insurance provider computers 150, 160, and the insurance provider programs/applications 250, 260 therein, generate and transmit to the facilitator system 210, 310, 400 an insurance eligibility transaction response, such as a 271 insurance eligibility transaction response, including eligibility terms, including at least one or more pieces of information 1) indicative of whether the insured/patient is presently covered by an insurance policy; 2) indicative of the benefit level for such insured/patient and for the type of medical treatment provided to the patient, including co-pay requirements and/or the existence of co-insurance and such co-insurance requirements, for such insured/patient; 3) indicative of credits or payments made toward the deductable as of the date of the request; and 4) indicative of any other state of the art determinations that are made by the insurance providers.

Specifically, FIG. 5 is a further exemplary embodiment of the insurance eligibility transaction enhancement and authentication facilitator 210, 310, 500 of the invention. At block 502, the one or more of the processors calls or triggers the facilitator system 210, 310, 500 or insurance provider program/application 250, 260 (which could trigger the beginning of the process that generates the above-mentioned insurance eligibility transaction response). After block 502, the facilitator system 210, 310, 500 moves to block 504. At block 504, the system 210, 310, 500 has logic for initiating, generating, and transmitting the insurance eligibility transaction response, which as mentioned above, can include at least a coverage determination of whether the insurance eligibility request should be granted for the insured/patient, as well as various other eligibility terms for the insured/patient if a positive coverage determination is provided.

After block 504, the facilitator system 210, 310, 500 moves to block 508. At block 508, the system 210, 310, 500 has logic for intercepting and receiving the insurance eligibility transaction response having the coverage determination and other eligibility terms therein for the insured and/or patient associated with the insurance eligibility transaction response. The facilitator system 210, 310, 500 intercepts the insurance eligibility transaction request prior to the insurance eligibility transaction response reaching the healthcare provider. After block 508, the facilitator system 210, 310, 500 moves to block 512. At block 512, the system 210, 310, 500 has logic for determining whether an insured/patient is underinsured. An underinsured person can include a person who does not have any coverage or who has less than a maximum threshold of insurance coverage. Specifically, in one embodiment, the facilitator system 210, 310, 500 determines whether the insured/patient person qualifies for third party subsidy or charity payments by first determining whether the coverage determination is less than a maximum threshold level. One example of the maximum threshold level can be the maximum amount of coverage that an insurance provider can provide before a third party governmental or other organization is willing to allow and still be willing to grant an insurance subsidy to the insured/patient. The facilitator system 210, 310, 500 can be in communication with third party subsidy provider computers (not shown) for referencing third party subsidy provider information and/or can reference third party subsidy provider information stored within the insurance eligibility transaction enhancement/authentication database 216. The third party subsidy provider information can include at least one or more subsidy provider or organization names (or health care financial assistance providers) as well as eligibility terms (or health care financial assistance information, such as provider qualification criteria), such as the maximum amount of insurance coverage that a person can be entitled to and yet still be able to qualify for a subsidy from that organization. In one embodiment the maximum threshold amount of insurance coverage required to receive a subsidy/grant is zero, and in other embodiments the maximum threshold is greater than zero coverage. Other terms can include the amount of subsidy the organization is willing to provide. For some organizations/health care financial assistance providers, the information can also include different levels of subsidies/grants that are available for different levels of need. The present embodiment can be utilized in conjunction with the system and method disclosed in U.S. Pat. No. 7,333,937, issued Feb. 19, 2008, entitled "Health Care Financing Method," which is hereby incorporated by reference herein in its entirety. If the facilitator system 210, 310, 500 determines that the person qualifies for a subsidy/grant, according to the above-described or incorporated system and/ or method, the facilitator system 210, 310, 500 can be configured to append the third party subsidy/grant payment information to the insurance eligibility transaction response, including at least the amount of subsidy/grant that the third party will provide for the healthcare goods or services provided by the healthcare provider, identified by medical code or in some other manner within healthcare eligibility transaction response.

After block 512, the facilitator system 210, 310, 500 moves to block 516. At block 516, the facilitator system 210, 310, 500 has logic for estimating an amount of coverage based on the coverage determination information provided within the insurance eligibility transaction response, and for appending the coverage estimation to the insurance eligibility transaction response. Specifically, in one embodiment, the facilitator system 210, 310, 500 estimates the amount of remaining payment that the patient is responsible for, to the extent not already performed by the insurance provider and insurance provider computers/program code. For example, assume a healthcare insurance eligibility transaction response includes that the insurance carrier will provide an eighty percent (80%) coverage for a $200 healthcare provider service, after an agreement of $100 between the insurance carrier/healthcare provider for that service is applied, the facilitator system 210, 310, 500 can be configured to calculate (100×0.8))=$20, which the insured/patient will be responsible for. The facilitator system 210, 310, 500 can also be configured to calculate the amount that the insurance provider will cover, such as $80 in the above example. Co-pays and other insurance terms can be utilized within the calculations to provide this information to the healthcare provider. The facilitator system 210, 310, 400 will then append these eligibility terms to the healthcare insurance eligibility transaction response for ease of understanding by the healthcare provider upon receipt of the healthcare insurance eligibility transaction response.

After block 516, the facilitator system 210, 310, 500 moves to block 520. At block 520, the facilitator system 210, 310, 500 can be further configured to query demographic data within the personal identity database after receiving the healthcare eligibility transaction response, which is performed for various purposes and functions. Specifically, in one embodiment, the facilitator system 210, 310, 500 can again parse out each of the pieces of the target personal information from within the healthcare eligibility transaction response, and again query the insurance eligibility transaction enhancement/authentication database 216 to determine if each piece of target personal information exists within the insurance eligibility transaction enhancement/authentication database 216. As mentioned above-herein, the insurance eligibility transaction enhancement/authentication database 216 or personal identity database can include "demographic data" for the individuals for which information exists within the insurance eligibility transaction enhancement/authentication database 216. The "demographic data" can include a name, an address, a social security number, an insurance member identification code, an insurance group code, an insurance card issue date, a date of birth, a credit score, and/or other demographic information. The facilitator system 210, 310, 500 can be further configured to query the demographic data, and to append additional associated demographic information from within the personal identity database to the insurance eligibility transaction response.

After block 516, the facilitator system 210, 310, 500 moves to block 520 and/or 530. At blocks 520 and 530, the system 210, 310, 500 also has logic for verifying or authenticating the target personal information within insurance eligibility transaction response. Specifically, in one embodiment, if the facilitator system 210, 310, 500 determines that there are one or more matches between the personal information within the response and the demographic data within the database, then the facilitator system 210, 310, 500 will make an initial determination of whether the matching information is sufficient to conclude that the target person within the insurance eligibility transaction request is the same as the person listed within the insurance eligibility transaction enhancement/authentication database 216. Likewise, the facilitator system 210, 310, 500 can be configured to also verify whether all of the pieces of personal information within the response are the same as the demographic data stored within the insurance eligibility transaction enhancement/authentication database 216 for the person. If any of the information within personal information is not the same as the demographic data for the person, the facilitator system 210, 310, 400 can be configured to replace one or more pieces of the target personal information with the demographic data, in order to verify that the personal information is authentic. The facilitator system 210, 310, 500 can also be configured to add verification information to the insurance eligibility response, designating one of more of the pieces of target personal information as verified personal information, if there is a match between the personal information within the response and the demographic data. At this stage, the facilitator system 210, 310, 500 can be configured to transmit the insurance eligibility transaction response having the verified personal information therein to a healthcare provider for use in providing coverage information to the insured/patient and to use such verified personal information to enhance the healthcare provider's databases having the insured/patient information therein.

Alternatively or additionally, the facilitator system 210, 310, 500 has logic for appending demographic information from within the insurance eligibility transaction enhancement/authentication database 216 to the personal information within the insurance eligibility transaction response. The demographic information that is appended or added to the response can be demographic data that was not previously a part of the insurance eligibility transaction response or some other ancillary data, as will be described. This demographic data can include a name, an address, a social security number, an insurance member identification code, an insurance group code, an insurance card issue date, a date of birth, a credit score, and/or other demographic information. The verified/authenticated and/or appended data or information can be used by the healthcare provider in making sure that a proper identification of the insured and/or patient takes place. In addition, this verified/authenticated data or information can be also be used to correct and/or enhance the healthcare provider's database and the information that the healthcare provider has within such database for the insured and/or patient. Thus, for any verified/authenticated personal information for the insured and/or patient within the insurance eligibility response that is different than the information within the healthcare provider's database, such verified/authenticated personal information is used to replace the information within the healthcare provider's database for that insured and/or patient. Likewise, for any appended personal information for the insured and/or patient within the insurance eligibility response that is different than or additional to the information within the healthcare provider's database, such appended personal information is used to replace or add to the information within the healthcare provider's database for that insured and/or patient.

The demographic information can also include alert information, such as information or an indication that the insured and/or patient has committed fraud in the past and/or may be attempting to commit fraud again within the response. This information can then be used by the healthcare provider within any decision to provide current or future healthcare services to the person within the insurance eligibility transaction response. In one embodiment, the facilitator system 210, 310, 500 can be configured to query ancillary data within an ancillary data database, and to determine whether the demographic data and/or the target personal information may have been used in a fraudulent manner based on the ancillary data within the ancillary data database.

After block 530, the facilitator system 210, 310, 500 moves to block 534. At block 534, the system 210, 310, 500 has logic for transmitting the authenticated and/or enhanced insurance eligibility transaction response to healthcare provider computers 120, 130, 140, and the healthcare provider programs/applications 220, 230 therein to the healthcare provider (payee), for use in obtaining payment and performing services to patients. Specifically, as one of ordinary skill in the art would understand, the healthcare provider computers 120, 130, 140, and the healthcare provider programs/applications 220, 230 therein, receive the insurance eligibility transaction response and perform one or matching steps on the response to attempt to match the verified/enhanced personal information about the insured/patient from within the response with information that may be within the healthcare provider's database of patients of that healthcare provider. The healthcare provider database of patients and insured persons is stored within a healthcare provider computer memory associated with and in communication with the healthcare provider computers 120, 130, 140, and the healthcare provider programs/applications 220, 230 therein. If there is match between one or more of the verified/enhanced personal information within the response and information associated with the insured person or patient within the healthcare provider database, then the healthcare provider programs/applications 220, 230 can be configured to parse out each piece of information within the response for the insured/patient and determine whether each piece of information about the insured/patient within the response is the same as and/or exists within the healthcare provider database for the insured/patient. After the healthcare provider computers 120, 130, 140, and the healthcare provider programs/applications 220, 230 therein determine that the person within the response is the same as a person within the healthcare provider database, the verified and/or enhanced pieces of information about the insured/patient within the response which are incorrect and/or are missing within the healthcare provider database are used by the healthcare provider computers 120, 130, 140, and the healthcare provider programs/applications 220, 230 therein, to replace the incorrect and/or missing information within the healthcare provider database, in order to enhance the data about each person within the healthcare provider database.

Relative to the insurance eligibility transaction response portion of the insurance eligibility transaction enhancement and authentication facilitator system 210, 310, 500, after block 534, the facilitator system 210, 310, 500 moves to decision block 536. At decision block 436, the facilitator system 210, 310, 500 has logic for determining whether there are any additional insurance eligibility transaction responses to process. If there are no additional responses to process, then the facilitator system 210, 310, 500 moves to decision block 540, and the process ends until a further response is received by the facilitator system 210, 310, 500. If there is one of more additional insurance eligibility transaction responses to process, then the facilitator system 210, 310, 500 moves back to decision block 504, and the process begins again.

As described herein, various computers and application programs described herein perform determinations of whether a person identified within an insurance eligibility transaction (request/response) matches with any of the individuals identified within a database, by attempting to match information associated with a person from within the insurance eligibility transaction and from within the database. Specifically, this process can be carried out by various portions and embodiments of the present system and method, such as by the facilitator system 210, 310, 400, 500, as well as by the insurance computers 150, 160 and application programs 250, 260 executing therein, as is referenced and described herein.

Any process descriptions or blocks in the figures, such as FIGS. 4-5 should be understood as representing modules, segments, or portions of software program code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

What is claimed is:

1. A non-transitory computer readable medium comprising program code that when executed by a computer processor within a system, conducts the operations of authenticating and enhancing an insurance eligibility transaction, the code comprising:

a first code segment executed by the computer processor, conducting the operation of receiving at the system an insurance eligibility transaction request having target personal information of a person associated with the insurance eligibility transaction request;

a second code segment executed by the computer processor, conducting the operation of querying demographic data within a personal identity database, wherein the data is not derived from an insurance eligibility transaction;

a third code segment executed by the computer processor, conducting the operation of, determining whether the target personal information matches the demographic data within the personal identity database; and a fourth code segment executed by the computer processor, conducting the operation of, transmitting from the system the insurance eligibility transaction request having the verified personal information therein to a payor to facilitate determination of whether the insurance eligibility request should be granted and to facilitate determination of eligibility terms under which the insurance eligibility request should be granted.

2. The non-transitory computer readable medium of claim 1, the code further comprising:
a fifth code segment executed by the computer processor, conducting the operation of designating the target personal information as verified personal information, when there is a match between the target personal information and the demographic data, wherein the insurance eligibility transaction request comprises the verified personal information.

3. The non-transitory computer readable medium of claim 1, the code further comprising:
a fifth code segment executed by the computer processor appending associated demographic information from within the personal identity database to the target personal information within the insurance eligibility transaction request.

4. The non-transitory computer readable medium of claim 1 wherein the associated demographic information comprises demographic information that was not previously comprised within insurance eligibility transaction request.

5. The non-transitory computer readable medium of claim 1 wherein the associated demographic information comprises at least one of a name, an address, a social security number, insurance member identification code, insurance group code, insurance card issue date, date of birth, and/or credit score.

6. The non-transitory computer readable medium of claim 1 wherein the associated demographic information comprises alert information.

7. The non-transitory computer readable medium of claim 6 wherein the alert information comprises an indication of fraud.

8. The non-transitory computer readable medium of claim 1 wherein the target personal information is at least one of a target name, an target address, a target social security number, a target insurance member identification code, a target insurance group code, a target insurance card issue date, a target date of birth.

9. The non-transitory computer readable medium of claim 1 wherein the person is at least one of a policy holder insured and/or a patient.

10. The non-transitory computer readable medium of claim 1 wherein the personal identity database is a personal credit reporting database.

11. The non-transitory computer readable medium of claim 1 wherein the personal identity database is a subset of a personal credit reporting database.

12. The non-transitory computer readable medium of claim 1 wherein the insurance eligibility transaction request is received from a healthcare provider.

13. The non-transitory computer readable medium of claim 1, the code further comprising:
a fifth code segment executed by the computer processor receiving at the system an insurance eligibility transaction response having a coverage determination of whether the insurance eligibility request should be granted for the person and having eligibility terms for the person when a positive coverage determination is provided; and,
a sixth code segment executed by the computer processor appending additional associated demographic information from within the personal identity database to the insurance eligibility transaction response.

14. The non-transitory computer readable medium of claim 1, the code further comprising:
a fifth code segment executed by the computer processor receiving at the system an insurance eligibility transaction response having a coverage determination of whether the insurance eligibility request should be granted for the person and having eligibility terms for the person when a positive coverage determination is provided, wherein the eligibility terms comprises benefit levels including at least one of co-pay information and/or deductible information.

15. The non-transitory computer readable medium of claim 1, the code further comprising:
a fifth code segment executed by the computer processor receiving at the system an insurance eligibility transaction response having a coverage determination of whether the insurance eligibility request should be granted for the person and having eligibility terms for the person when a positive coverage determination is provided;
a sixth code segment executed by the computer processor, querying ancillary data within an ancillary data database;
a seventh code segment executed by the computer processor, determining whether the demographic data and/or the target personal information may have been used in a fraudulent manner; and,
an eighth code segment executed by the computer processor transmitting from the system the insurance eligibility transaction response having the coverage determination therein to a healthcare provider.

16. The non-transitory computer readable medium of claim 1, the code further comprising:
a fifth code segment executed by the computer processor receiving at the system an insurance eligibility transaction response having a coverage determination of whether the insurance eligibility request should be granted for the person;
a sixth code segment executed by the computer processor determining, whether the person qualifies for third party subsidy payments when the coverage determination is less than a maximum threshold level; and, a seventh code segment executed by the computer processor appending third party subsidy payment information to the insurance eligibility transaction response if the person qualifies for third party subsidy payments.

17. The non-transitory computer readable medium of claim 16 wherein the maximum threshold level is greater than zero coverage.

18. The non-transitory computer readable medium of claim 1, the code further comprising:
a fifth code segment executed by the computer processor receiving at the system an insurance eligibility transaction response having coverage determination information comprising a determination of whether the insurance eligibility request should be granted for the person;
a sixth code segment executed by the computer processor estimating an amount of coverage based on coverage determination information provided within the insurance eligibility transaction response; and,
a seventh code segment executed by the computer processor appending the coverage estimation to the insurance eligibility transaction response.

19. The non-transitory computer readable medium of claim 18 wherein the response is an ANSI X12 271 healthcare system transaction.

20. The non-transitory computer readable medium of claim 1 wherein the request is an ANSI X12 270 healthcare system transaction.

21. A non-transitory computer readable medium comprising program code for execution on a computer processor within a system, for authenticating and enhancing an insurance eligibility transaction, the code comprising:
   a first code segment executed by the computer processor receiving at the system an insurance eligibility transaction response having a coverage determination of whether an insurance eligibility request should be granted for a person and having eligibility terms for the person if a positive coverage determination is provided; and,
   a second code segment executed by the computer processor appending additional associated demographic information from within a personal identity database to the insurance eligibility transaction response, wherein the demographic information is not derived from an insurance eligibility transaction.

22. A non-transitory computer readable medium comprising program code for execution on a computer processor within a system, for authenticating and enhancing an insurance eligibility transaction, the code comprising:
   a first code segment executed by the computer processor receiving at the system an insurance eligibility transaction response having a coverage determination of whether an insurance eligibility request should be granted for a person and having eligibility terms for the person when a positive coverage determination is provided;
   a second code segment executed by the computer processor querying ancillary data not associated with an insurance eligibility transaction within an ancillary data database;
   a third code segment executed by the computer processor determining, using the processor, whether demographic data and/or target personal information may have been used in a fraudulent manner and generating an alert if there is a positive determination; and,
   a fourth code segment executed by the computer processor transmitting from the system the insurance eligibility transaction response having the coverage determination and the alert therein to a healthcare provider.

23. A non-transitory computer readable medium comprising program code for execution on a computer processor within a system, for authenticating and enhancing an insurance eligibility transaction, the code comprising:
   a first code segment executed by the computer processor receiving at the system an insurance eligibility transaction response having a coverage determination of whether an insurance eligibility request should be granted for a person;
   a second code segment executed by the computer processor determining, using the processor, whether the person qualifies for third party subsidy payments if the coverage determination is less than a maximum threshold level; and,
   a fourth code segment executed by the processor appending third party subsidy payment information to the insurance eligibility transaction response if the person qualifies for third party subsidy payments.

24. A non-transitory computer readable medium comprising program code for execution on a computer processor within a system, for authenticating and enhancing an insurance eligibility transaction, the code comprising:
   a first code segment executed by the computer processor receiving at the system an insurance eligibility transaction response having coverage determination information comprising a determination of whether the insurance eligibility request should be granted for a person;
   a second code segment executed by the computer processor estimating an amount of coverage based on coverage determination information provided within the insurance eligibility transaction response; and,
   a third code segment executed by the computer processor appending the coverage estimation to the insurance eligibility transaction response.

25. A system for authenticating and enhancing an insurance eligibility transaction, comprising:
   an authentication and enhancement computer having a processor and an associated memory, the memory having authentication and enhancement program code, wherein the program code is configured to receive at the system an insurance eligibility transaction request having target personal information for a person associated with the insurance eligibility transaction request;
   a demographic database within a personal identity database, wherein the demographic database is not derived from insurance eligibility transactions, the program code being further configured to query the demographic data using the processor, and to determine whether the target personal information matches the demographic data within the personal identity database, using the processor; and wherein the program code is further configured to transmit from the system the insurance eligibility transaction request having the verified personal information therein to a payor to facilitate determination of whether the insurance eligibility request should be granted and to facilitate determination of eligibility terms under which the insurance eligibility request should be granted.

26. The system of claim 25 wherein the program code is further configured to append, using the processor, associated demographic information from within the personal identity database to the target personal information within the insurance eligibility transaction request.

27. A system for authenticating and enhancing an insurance eligibility transaction, comprising:
   an authentication and enhancement computer having a processor and an associated memory, the memory having authentication and enhancement program code, wherein the program code is configured to receive at the system an insurance eligibility transaction response having a coverage determination of whether the insurance eligibility request should be granted for the person and having eligibility terms for the person when a positive coverage determination is provided, wherein the eligibility terms comprises benefit levels including at least one of co-pay information and/or deductible information; and,
   a demographic database within a personal identity database, wherein the demographic database is not derived from insurance eligibility transactions, the program code being further configured to query, using the processor, the demographic data, and to append, using the processor, additional associated demographic information from within the personal identity database to the insurance eligibility transaction response.

28. A method performed by an insurance eligibility transaction authentication and enhancement computer, for authenticating and enhancing an insurance eligibility transaction, comprising the steps of:

receiving at the computer an electronic insurance eligibility transaction request having target personal information for a person associated with the insurance eligibility transaction request;

querying, using the processor, non-insurance eligibility derived demographic data within a personal identity database stored within computer memory;

determining, using the processor, whether the target personal information matches the demographic data within the personal identity database; and, transmitting from the computer the insurance eligibility transaction request having the verified personal information therein to a payor to facilitate determination of whether the insurance eligibility request should be granted and to facilitate determination of eligibility terms under which the insurance eligibility request should be granted.

29. The method of claim 28 further comprising the step of:
designating, using the processor, the target personal information as verified personal information, when there is a match between the target personal information and the demographic data, wherein the insurance eligibility transaction request comprises the verified personal information.

30. The method of claim 28 further comprising the step of:
appending, using the processor, associated demographic information from within the personal identity database to the target personal information within the insurance eligibility transaction request.

\* \* \* \* \*